Patented Mar. 4, 1924.

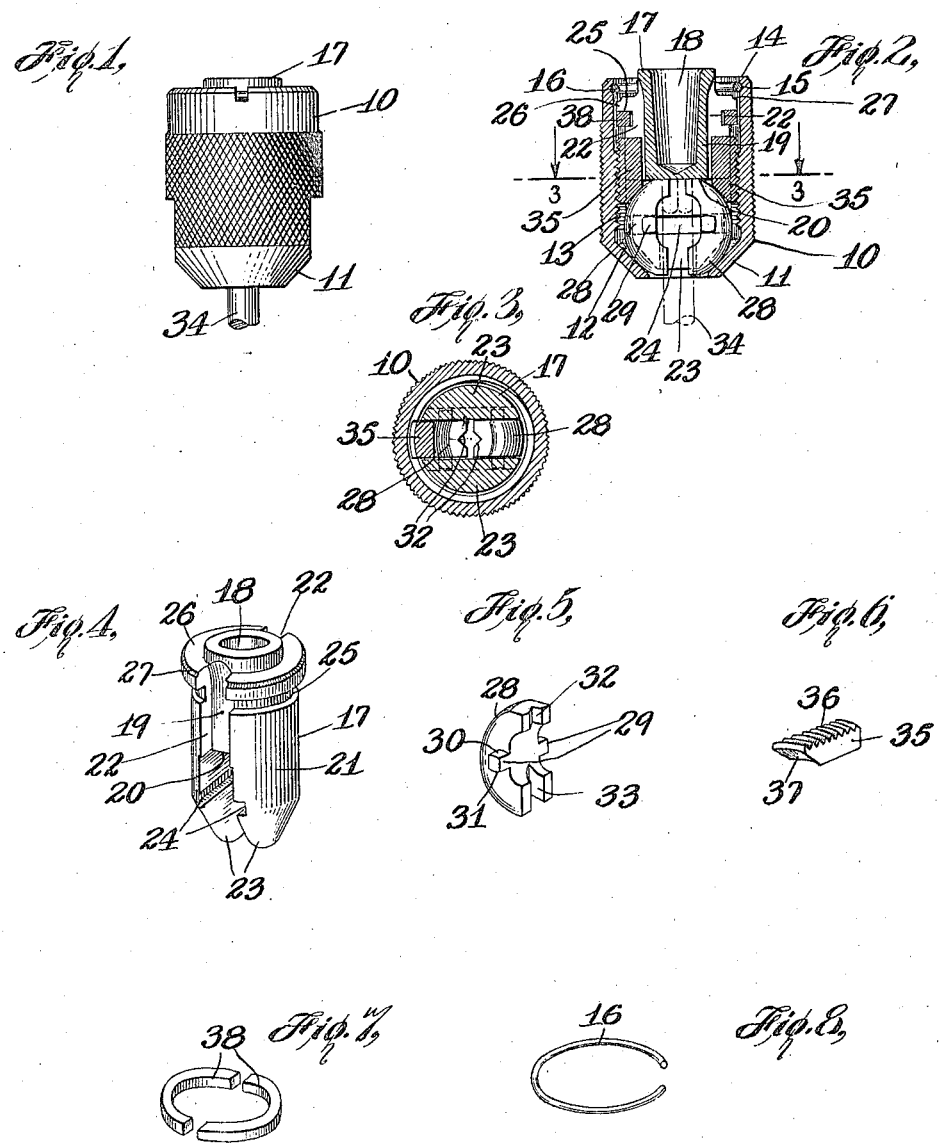

1,485,671

UNITED STATES PATENT OFFICE.

GEORGE W. EMRICK, OF BROOKLYN, NEW YORK, ASSIGNOR TO EASTERN TUBE AND TOOL COMPANY, A CORPORATION OF NEW YORK.

CHUCK.

Application filed June 23, 1922. Serial No. 570,465.

*To all whom it may concern:*

Be it known that I, GEORGE W. EMRICK, a citizen of the United States, and residing at Brooklyn, in the county of Kings and State of New York, have invented certain new and useful Improvements in Chucks, of which the following is a specification, such as will enable those skilled in the art to which it appertains to make and use the same.

This invention relates to chuck devices and particularly to devices of this class designed for supporting such tools as taps, reamers and the like, and the object of the invention is to provide a chuck of the class specified with means for providing the universal mounting of the tool in connection with the chuck to facilitate its proper alinement in a workpiece; a further object being to provide means for firmly gripping the shank of the tool in the chuck; and with these and other objects in view the invention consists in a chuck device of the class and for the purpose specified, which is simple in construction and operation and efficient in use, and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of my improved chuck;

Fig. 2 a transverse section through the chuck;

Fig. 3 a section on the line 3—3 of Fig. 2; and

Figs. 4 to 8 inclusive are perspective detail views of parts of the construction which I employ.

In practice, I provide a suitable chuck casing 10 which is tubular in form and the end 11 of which is conical in form to provide a conical face 12 within said end of the casing, and the casing is internally threaded as shown at 13 above the conical end 11, and adjacent to the end 14 thereof the inner face of the casing is provided with an annular groove 15 adapted to receive a retaining split ring 16 which holds the separate parts of the chuck against displacement from the casing 10, and this ring is shown in detail in Fig. 8 of the drawing.

Loosely mounted in the casing 10 is a supplemental chuck body 17, the upper end of which is provided with a tapered bore 18 adapted to receive the tapered pin in the usual manner, and the body 17 comprises a central member 19 which terminates at 20, and in which the bore 18 is formed. Around the central member the body 17 is enlarged to form a substantially cylindrical plug 21 the opposite sides of which are cut away to form recesses 22 and below the central portion 19 the plug 21 is cut transversely and in line with the recesses 22 to form separate depending members 23, the outer faces of which are conical in form as clearly shown in Fig. 4 of the drawing. The members 23 are provided with transverse grooves 24 on their inner faces, and an annular groove 25 is formed in the periphery of the plug 21 adjacent to the upper end thereof, and said end of the plug is enlarged to form a flange 26, the upper corner of which is slightly curved as shown at 27 to cooperate with the split ring 16 as clearly shown in Fig. 2.

I also employ two substantially semi-circular jaw members 28, one of which is shown in detail in Fig. 5 of the drawing, and the width of these members correspond to or are of slightly less dimension than the transverse dimensions of the recesses 22, and said jaw members are provided on opposite sides with projecting lugs 29 which are adapted to extend into the grooves 24 and serve to retain said jaw members in predetermined location and also permit of the radial movement of said jaws. The top and bottom faces 30 and 31 of the lugs are preferably rounded to permit of a slight rocking action of the separate jaw members between the members 23 and in the grooves 24. The inner faces of the jaw members 28 are provided in the top thereof with V-shaped recesses 32, and in the bottom thereof with similar but preferably larger recesses 33 in connection with which the shank of a suitable tool 34 is adapted to operate.

I also employ two wedge members 35, one of which is shown in detail in Fig. 6 of the drawing, and these wedge members are of slightly less transverse dimensions than the corresponding dimensions of the recesses 22 and are adapted to fit in said recesses and to move vertically therein. The outer faces of said wedge members are threaded as shown at 36 to operate in connection with the threads 13 in the casing 10, and the lower ends of said wedge members are beveled on their inner faces as shown at 37 and are adapted to operate in connection with the curved outer faces of the jaw members 28, as clearly shown in Fig. 2 of the drawing to wedge said jaw members against the beveled seat 12 in the lower end of the casing 10 and to move said jaw members inwardly and radially into engagement with the shank of the tool 34. By reason of the mounting of the jaw members 28 and wedge members 35 in the body 17 or the recesses 22 thereof, said jaw members and wedge members are capable of movement transversely of the longitudinal line of said recesses to a slight extent.

I also employ two semi-circular retaining members 38 which are shown in detail in Fig. 7 of the drawing, and which are adapted to be placed in the annular groove 25 of the chuck body 17, as clearly shown in Fig. 2 of the drawing, and these members serve to limit the upward movement of the wedge members 35 in the casing 10 and to prevent the detachment or displacement of said members.

As hereinbefore stated, my improved chuck device is particularly designed for use in supporting such tools as taps, reamers and the like, to facilitate the automatic centering of the tool in the workpiece by providing a movable or universal mounting of the tool in the chuck, or in connection with that portion of the chuck which is rigidly secured to the rotatable power member, namely, the chuck body 17. It will be noted that sufficient clearance is allowed between the chuck body 17 and the casing 10, and between the wedge members 35 and said chuck body 17 as to facilitate a slight lateral or radial movement of the tool upon the body 17 in every direction, and if the spindle which is inserted into the aperture 18 should be out of line with the workpiece to a slight extent, the movable mounting of the tool will compensate for this inaccuracy and will also permit of the proper threading and reaming of a hole or holes in a workpiece.

Another feature of my invention lies in the ability of the jaw members 28 to rock in their supports to adapt said jaw members to shanks of tools having different diameters, or tools provided with square ends and round shanks, it being understood that the separate jaws 32 and 33 of said members are capable of greater or less movement toward and from each other.

In the operation of my improved device and in inserting a tool into the chuck and securing the same therein, the casing 10 is revolved so as to separate the jaws 28 to permit of the insertion of the shank of the tool, after which said casing is revolved in the opposite direction, which moves the wedge members 35 downwardly to force or clamp the jaw members 28 between said wedge members and the tapered faces 12, and in this operation both of the jaws 32 and 33 of the jaw members will be moved into operative position to firmly grasp the tool therebetween. In the above operation it will also be understood that said jaw members are moved radially of the chuck in the grooves 24 and are guided in this operation by the lugs 29. When the tool has been secured in position the casing 10 and said tool as well as the jaw members 28 and wedge members 35 will be free to move radially to a slight extent in any direction by reason of the clearance allowed between said parts, as above set out. In removing the tool, the casing 10 is rotated in the opposite direction to that last named and the wedge members 35 will be moved upwardly in the casing and the jaw members 28 moved outwardly and radially of the casing thus freeing the shank of the tool.

It will be understood that the chuck device will be made up in different sizes, and while I have shown certain details of construction for carrying my invention into effect, it will be understood that I am not necessarily limited to these details, nor am I limited to any specific use of the chuck, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A chuck device of the class described comprising a suitable chuck body, a casing mounted on said chuck body and retained against detachment therefrom, said casing being capable of lateral and oscillatory movement on said chuck body, jaw members movably mounted in said chuck body, and means controlled by said casing, for moving said jaw members into position to firmly grasp a suitable tool therebetween while permitting the movement of all of said parts on said chuck body.

2. A chuck device of the class described comprising a suitable chuck body, a casing enclosing said chuck body and capable of lateral and oscillatory movement thereon, jaw members movably mounted in said chuck body and capable of radial and oscillatory movement therein, and means involving said casing for moving said jaw members radially of the chuck body to firmly grasp a suitable tool.

3. A chuck device of the class described comprising a suitable chuck body, a casing enclosing said chuck body, jaw members movably mounted in said chuck body and capable of radial and oscillatory movement therein, means involving said casing for moving said jaw members radially of the chuck body to firmly grasp a suitable tool, and said casing, jaw members, tool and last named means constituting a unit capable of lateral and oscillatory movement on said chuck body.

4. A chuck device of the class described comprising a suitable chuck body, a casing enclosing said chuck body, jaw members movably mounted in said chuck body and capable of radial and oscillatory movement therein, means involving said casing for moving said jaw members radially of the chuck body to firmly grasp a suitable tool, said casing, jaw members, tool and last named means constituting a unit capable of lateral and oscillatory movement on said chuck body, and means whereby the rotation of said casing will control the movement of the jaw operating means.

5. A chuck device of the class described comprising a suitable chuck body, a casing enclosing said chuck body, jaw members movably mounted in said chuck body and capable of radial and oscillatory movement therein, means involving said casing for moving said jaw members radially of the chuck body to firmly grasp a suitable tool, said casing, jaw members, tool and last named means constituting a unit capable of lateral and oscillatory movement on said chuck body, means whereby the rotation of said casing will control the movement of the jaw operating means, and means mounted on said chuck body for limiting the movement of said jaw operating means in one direction.

6. A chuck device of the class described comprising a suitable chuck body, a casing enclosing said chuck body, jaw members movably mounted in said chuck body and capable of radial and oscillatory movement therein, means involving said casing for moving said jaw members radially of the chuck body to firmly grasp a suitable tool, said casing, jaw members, tool and last named means constituting a unit capable of lateral and oscillatory movement on said chuck body, means whereby the rotation of said casing will control the movement of the jaw operating means, means mounted on said chuck body for limiting the movement of said jaw operating means in one direction, and means for retaining said casing against detachment from said chuck body.

7. The herein described means for movably supporting and retaining a tool in connection with a chuck body comprising a casing mounted in connection with said chuck body and capable of radial movement thereon, jaw members mounted in said chuck body and capable of oscillatory and radial movement therein, means in threaded engagement with said casing and keyed to said chuck body for moving said jaw members radially of said chuck body, and said jaw members cooperating with said casing.

8. The herein described means for movably supporting and retaining a tool in connection with a chuck body comprising a casing mounted in connection with said chuck body and capable of radial movement thereon, jaw members mounted in said chuck body and capable of oscillatory and radial movement therein, means in threaded engagement with said casing and keyed to said chuck body for moving said jaw members radially of said chuck body, said jaw members cooperating with said casing, and means detachably mounted on said chuck body for limiting the movement of said last named means in one direction.

9. The herein described means for movably supporting and retaining a tool in connection with a chuck body comprising a casing mounted in connection with said chuck body and capable of radial movement thereon, jaw members mounted in said chuck body and capable of oscillatory and radial movement therein, means in threaded engagement with said casing and keyed to said chuck body for moving said jaw members radially of said chuck body, said jaw members cooperating with said casing, means detachably mounted on said chuck body for limiting the movement of said last named means in one direction, and means detachably mounted in said casing for preventing the detachment of said casing from said chuck body.

10. A chuck device of the class described, comprising a chuck body, jaw members mounted in connection with and keyed to said chuck body to permit of radial and rotary oscillatory movement of said jaw members therein, and means encircling said chuck body and jaw members and cooperating with said jaw members for moving said jaw members into position to grasp a tool therebetween and for rigidly retaining said tool in said jaw members and last named means and for permitting of lateral and oscillatory movement of said tool relatively to said chuck body.

11. A chuck device of the class described, comprising a chuck body, jaw members mounted in connection with and keyed to said chuck body to permit of radial and rotary oscillatory movement of said jaw members therein, means encircling said chuck body and jaw members and cooperating with said jaw members for moving said jaw members into position to grasp a tool therebetween and for rigidly retaining said tool in said jaw members and last named means and for permitting of lateral and oscillatory movement of said tool relatively to said chuck body, said last named means involving a casing, and wedge members in threaded engagement with said casing and keyed to said chuck body.

12. A chuck device of the class described comprising a chuck body, jaw members mounted in connection with and keyed to said chuck body to permit of radial and rotary oscillatory movement of said jaw members therein, means encircling said chuck body and jaw members and cooperating with said jaw members for moving said jaw members into position to grasp a tool therebetween and for rigidly retaining said tool in said jaw members and last named means and for permitting of lateral and oscillatory movement of said tool relatively to said chuck body, said last named means involving a casing, wedge members in threaded engagement with said casing and keyed to said chuck body, and means detachably mounted in connection with said chuck body for limiting the movement of said wedge members in one direction.

13. A chuck device of the class described comprising a chuck body, jaw members mounted in connection with and keyed to said chuck body to permit of radial and rotary oscillatory movement of said jaw members therein, means encircling said chuck body and jaw members and cooperating with said jaw members for moving said jaw members into position to grasp a tool therebetween and for rigidly retaining said tool in said jaw members and last named means and for permitting of lateral and oscillatory movement of said tool relatively to said chuck body, said last named means involving a casing, wedge members in threaded engagement with said casing and keyed to said chuck body, means detachably mounted in connection with said chuck body for limiting the movement of said wedge members in one direction, and a split ring for retaining said casing against detachment from said chuck body.

14. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, and projecting pins on said jaw members cooperating with the transverse grooves therein.

15. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, and projecting pins on said jaw members cooperating with the transverse grooves therein, whereby said jaw members are capable of radial and rotary reciprocating movement in said chuck body.

16. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, and wedge members adapted to be placed in said vertical grooves and movable longitudinally thereof and adapted to cooperate with said jaw members.

17. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, wedge members adapted to be placed in said vertical grooves and movable longitudinally thereof and adapted to cooperate with said jaw members, said chuck body being provided with an annular groove in which a two-part member is adapted to be placed for limiting the movement of said wedge members in said vertical grooves in one direction.

18. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, wedge members adapted to be placed in said vertical grooves and movable longitudinally thereof and adapted to cooperate with said jaw members, said chuck body being provided with an annular groove in which a two-part member is adapted to be placed for limiting the movement of said wedge members in said vertical grooves in one direction, and a hollow casing adapted to be mounted on said chuck body and one end of which is tapered to cooperate with said jaw members.

19. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, wedge members adapted to be placed in said vertical grooves and movable longitudinally thereof and adapted to cooperate with said jaw members, said chuck body being provided with an annular groove in which a two-part member is adapted to be placed for limiting the movement of said wedge members in said vertical grooves in one direction, and a hollow casing adapted to be mounted on said chuck body and one end of which is tapered to cooperate with said jaw members, said casing being in threaded engagement with said wedge members.

20. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, wedge members adapted to be placed in said vertical grooves and movable longitudinally thereof and adapted to cooperate with said jaw members, said chuck body being provided with an annular groove in which a two-part member is adapted to be placed for limiting the movement of said wedge members in said vertical grooves in one direction, a hollow casing adapted to be mounted on said chuck body and one end of which is tapered to cooperate with said jaw members, said casing being in threaded engagement with said wedge members, and said casing, wedge members and jaw members being movable about the axis of said chuck.

21. A chuck device of the class described comprising a chuck body substantially cylindrical in form and provided at one end with a bore to receive a spindle, the other end portion of said chuck body being provided with a transverse aperture having transverse grooves in the walls thereof, the opposite sides of said chuck body being provided with vertical grooves and substantially semi-circular jaw members adapted to be mounted in the aperture of said chuck body, projecting pins on said jaw members cooperating with the transverse grooves therein, whereby said jaw members are capable of radial and rotary reciprocating movement in said chuck body, wedge members adapted to be placed in said vertical grooves and movable longitudinally thereof and adapted to cooperate with said jaw members, said chuck body being provided with an annular groove in which a two-part member is adapted to be placed for limiting the movement of said wedge members in said vertical grooves in one direction, a hollow casing adapted to be mounted on said chuck body and one end of which is tapered to cooperate with said jaw members, said casing being in threaded engagement with said wedge members, said casing, wedge members and jaw members being movable about the axis of said chuck, and a spring ring for retaining said casing against detachment from said chuck body.

22. A chuck device of the class described comprising a chuck body, a member encircling said chuck body, jaw members mounted within said member and keyed to and movable radially of said chuck body and capable of rotary oscillatory movement therein, and means within said member and keyed to and movable in said chuck body and adapted to cooperate with said jaw members for securing a tool between said jaw members and for rigidly supporting said tool in connection with said member, and said member and tool being movable relatively to the axis of said chuck body.

In testimony that I claim the foregoing as my invention I have signed my name this 21st day of June, 1922.

GEORGE W. EMRICK.